US012645417B2

(12) United States Patent
Bertrand

(10) Patent No.: US 12,645,417 B2
(45) Date of Patent: Jun. 2, 2026

(54) DIGITAL DISPLAY SYSTEM AND METHOD

(71) Applicant: JCDECAUX SE, Neuilly sur Seine (FR)

(72) Inventor: Ludovic Bertrand, Breval (FR)

(73) Assignee: JCDECAUX SE, Neuilly sur Seine (FR)

( * ) Notice: Subject to any disclaimer, the term of this patent is extended or adjusted under 35 U.S.C. 154(b) by 223 days.

(21) Appl. No.: 18/288,004

(22) PCT Filed: Apr. 26, 2022

(86) PCT No.: PCT/EP2022/061112
§ 371 (c)(1),
(2) Date: Oct. 23, 2023

(87) PCT Pub. No.: WO2022/229226
PCT Pub. Date: Nov. 3, 2022

(65) Prior Publication Data
US 2024/0201923 A1     Jun. 20, 2024

(30) Foreign Application Priority Data

Apr. 28, 2021     (FR) ..................................... 21 04456

(51) Int. Cl.
*G06F 3/14*          (2006.01)
*G09G 5/00*          (2006.01)
(Continued)

(52) U.S. Cl.
CPC .......... *G06F 3/1446* (2013.01); *G06F 3/1423* (2013.01); *G09G 5/006* (2013.01);
(Continued)

(58) Field of Classification Search
CPC .... G06F 3/1446; G06F 3/1423; G06F 16/278; G09G 5/006; G09G 5/12; G09G 2380/06;
(Continued)

(56) References Cited

U.S. PATENT DOCUMENTS 6,829,664 B2     12/2004   Nomizo et al.
10,231,008 B2     3/2019   Møller et al.
(Continued)

FOREIGN PATENT DOCUMENTS

CN          112217960 A       1/2021
EP           1649355 B1       4/2007
(Continued)

OTHER PUBLICATIONS

International Search Report & Written Opinion related to Application No. PCT/EP2022/061112 reported on Sep. 20, 2022.
(Continued)

*Primary Examiner* — Vinncelas Louis
(74) *Attorney, Agent, or Firm* — von Briesen & Roper, s.c.

(57)          ABSTRACT

Digital display method for displaying digital contents in a coordinated manner by digital display devices (2) belonging to a group (G), the digital contents being defined in playlists stored by each of the digital display devices, the method including: electing a leader among said digital display devices of the group, using a consensus algorithm; determining from synchronization messages sent by the leader to the other digital display devices of the group, a display starting time for each digital content defined by the playlist of each device of digital display of the group.

14 Claims, 3 Drawing Sheets

(51) Int. Cl.

| | |
|---|---|
| *G09G 5/12* | (2006.01) |
| *H04N 21/242* | (2011.01) |
| *H04N 21/262* | (2011.01) |
| *H04N 21/414* | (2011.01) |
| *H04N 21/43* | (2011.01) |
| *H04N 21/6547* | (2011.01) |
| *H04N 21/8547* | (2011.01) |
| *H04N 21/41* | (2011.01) |

(52) U.S. Cl.
CPC ............. *G09G 5/12* (2013.01); *H04N 21/242* (2013.01); *H04N 21/26258* (2013.01); *H04N 21/41415* (2013.01); *H04N 21/43076* (2020.08); *H04N 21/6547* (2013.01); *H04N 21/8547* (2013.01); *H04N 21/4122* (2013.01)

(58) Field of Classification Search
CPC ........... H04N 21/242; H04N 21/26258; H04N 21/41415; H04N 21/43076; H04N 21/6547; H04N 21/8547; H04N 21/4122; H04N 21/4307; G06N 20/00; G01R 22/063; H04L 63/1441; H04L 9/16; H04W 4/70
See application file for complete search history.

(56) References Cited

U.S. PATENT DOCUMENTS

| | | | |
|---|---|---|---|
| 2010/0031366 A1 | 2/2010 | Knight | |

| 2015/0029880 A1* | 1/2015 | Burns ..................... H04W 4/70 370/252 |
| 2016/0217388 A1* | 7/2016 | Okanohara ............ G06N 20/00 |
| 2017/0024453 A1* | 1/2017 | Raja ....................... G06F 16/278 |
| 2018/0067864 A1* | 3/2018 | Park ..................... G01R 22/063 |
| 2020/0213566 A1* | 7/2020 | Sakai ............... H04N 21/43076 |
| 2022/0109570 A1* | 4/2022 | Fang ......................... H04L 9/16 |
| 2023/0388339 A1* | 11/2023 | Huang ............... H04L 63/1441 |

FOREIGN PATENT DOCUMENTS

| JP | 2016224140 A | 12/2016 |
|---|---|---|
| JP | 2020106580 A | 7/2020 |
| WO | 2020256766 A1 | 12/2020 |

OTHER PUBLICATIONS

French Search Report related to Application No. 2104456 reported on Feb. 7, 2023.
Dutch Search Report Related to Application No. 2031651, reported on Mar. 17, 2025.
Japanese Notice of Reasons for Rejection Office Action related to Application No. 2023-566677; reported on Feb. 10, 2026.
Kengo Kajiwara et al., Raft Distributed Consensus Algorithms Survey, The 9th Data Engineering and Information Management Forum (15th Annual Meeting of the Database Society of Japan) [online], IEICE Data Engineering Research Committee, Japan Database Society of Japan, IPSJ Database System Workshop, Feb. 27, 2017, pp. 1-3.

* cited by examiner

DIGITAL DISPLAY SYSTEM AND METHOD

CROSS-REFERENCE TO RELATED APPLICATION

This Application is a 35 USC § 371 US National Stage filing of International Application No. PCT/BP2022/061112 filed on Apr. 26, 2022, and claims priority under the Paris Convention to French Patent Application No. 2104456 filed on Apr. 28, 2021.

FIELD OF THE DISCLOSURE

This description relates to digital display systems and methods.

BACKGROUND OF THE DISCLOSURE

Digital display methods are known which allow the coordinated display of digital contents by digital display devices, of a group of digital display devices, generally a group of digital display devices simultaneously visible by a same observer. These known digital display methods generally make use of a central server which synchronizes the displays of the digital display devices in the group. An example of this prior art technique is given in document EP1649355.

This prior technique has the disadvantage of being highly dependent on good connectivity of the digital display devices, which is not always the case.

SUMMARY OF THE DISCLOSURE

The purpose of the present description is in particular to improve the efficiency of these methods, in particular in order to ensure proper coordination of the display of digital contents by the various digital display devices of a group, even when said digital displays devices of the group do not get an excellent connectivity.

To this end, the present description proposes a digital display method for displaying digital contents in a coordinated manner by digital display devices belonging to a group, the digital contents being defined in playlists stored by each of the digital display devices, the method including:

electing by the digital display devices of the group, a leader among said digital display devices of the group, using a consensus algorithm;

determining from synchronization messages sent by the leader to the other digital display devices of the group, a display starting time for each digital content defined by the playlist of each device of digital display of the group.

Thanks to these arrangements, the proposed digital display method is particularly reliable and resilient with respect to connectivity problems.

In various embodiments of the digital display method, one and/or the other of the following arrangements can possibly further be used (alone or in all their mutual combinations, possibly independently of the aforementioned arrangements):

the consensus algorithm is a "RAFT" algorithm;

the digital display devices of the group are simultaneously visible to a same observer;

the display starting times of the respective digital contents defined by the playlists of the digital display devices of the group are either identical or temporally offset in a predetermined way;

the messages sent between the digital display devices of the group are authenticated by a digital signature;

the messages sent between the digital display devices of the group have a timestamp, and the digital signature is calculated taking into account the timestamp;

the messages sent between the digital display devices of the group have a timestamp, and each digital display device of the group which receives a message from another digital display device of the group calculates a difference between the timestamp of the message received and the current time, and not taking into account the message received if said difference is greater than a predetermined threshold;

the messages sent between the digital display devices of the group are non-encrypted, which contributes to real-time operation allowing excellent synchronization to be obtained, without creating any security breach, the security being ensured by the electronic signature possibly reinforced by the timestamp;

the digital display devices of the group communicate with each other according to a "UDP" protocol, the synchronization messages allowing synchronization with an error of less than 1 ms between the digital display devices of the group, excluding intrinsic network latency;

the digital display devices of the group belong to a set of digital display devices also comprising digital display devices not belonging to said group, the method further comprising:

keeping updated by a central platform, a list of digital display devices of the set which belong to said group;

repetitively updating the digital display devices of the set with said central platform so that each digital display device of the set has in memory a piece of information indicating whether it belongs to a group and so that each digital display device of said group has in memory the list of digital display devices of said group;

the method further comprises: informing the digital display devices of the set, via the central platform, about the digital contents which they must play;

the method further comprises:

generating by said platform the playlists according to displaying campaigns, each playlist comprising information necessary for one or several of said digital display devices to display said digital contents during successive time slots;

repeatedly updating the digital display devices of the set with said central platform so that each digital display device has in memory the updated playlist generated for it by said central platform.

Furthermore, the present description also relates to a digital display system comprising digital display devices, at least some of said digital display devices belonging to a group, the digital contents being defined in playlists memorized by each of the digital display devices, the digital display devices of the group being adapted to:

elect a leader among said digital display devices of the group, using a consensus algorithm, said leader being adapted to send synchronization messages to the other digital display devices of the group;

determine from the synchronization messages, a display starting time for each digital content defined by the playlist of each device of digital display of the group.

In various embodiments of the digital display system, one and/or the other of the following arrangements can possibly further be used (alone or in all their mutual combinations, possibly independently of the aforementioned arrangements):

the consensus algorithm is a "RAFT" algorithm;

the digital display devices of the group are simultaneously visible to a same observer;

the display starting times of the respective digital contents defined by the playlists of the digital display devices of the group are either identical or temporally offset in a predetermined way;

the messages sent between the digital display devices of the group are authenticated by a digital signature;

the messages sent between the digital display devices of the group have a timestamp, and the digital signature is calculated taking into account the timestamp;

the messages sent between the digital display devices of the group have a timestamp, and each digital display device of the group which receives a message from another digital display device of the group is adapted to:

calculate a difference between the timestamp of the received message and the current time, and not take into account the received message if said difference is greater than a predetermined threshold;

the messages sent between the digital display devices of the group are non-encrypted, which contributes to real-time operation allowing excellent synchronization to be obtained, without creating any security breach, the security being ensured by the electronic signature possibly reinforced by the timestamp;

the digital display devices of the group communicate with each other according to a "UDP" protocol, the synchronization messages allowing synchronization with an error of less than 1 ms between the digital display devices of the group, excluding intrinsic network latency;

the digital display devices of the group belong to a set of digital display devices also comprising digital display devices not belonging to said group, the system further comprising a central platform adapted to keeping up to date a list of digital display devices of the set which belong to said group, the system being adapted to repeatedly update the digital display devices of the set with said central platform so that each digital display device of the set has in memory a piece of information indicating whether it belongs to a group and so that each digital display device of said group has in memory the list of digital display devices of said group;

the central platform is also adapted to inform the digital display devices of the set, of the digital content that they must play;

said platform is adapted to generate the playlists according to displaying campaigns, each playlist comprising information necessary for one or several of said digital display devices to display said digital contents during successive time slots; and the system is adapted to repeatedly update the digital display devices of the set with said central platform so that each digital display device has in memory the updated playlist generated for it by said central platform.

BRIEF DESCRIPTION OF THE DRAWINGS

Other features and advantages of the digital display method and the digital display system will appear from the following description of one of their implementation forms, given as a non-limiting example, with reference to the attached drawings.

In the drawings:

FIG. 1 is a schematic view showing a digital display system according to an implementation form.

FIG. 2 is a schematic view showing a digital display device of the system of FIG. 1.

FIG. 3 is a schematic view showing a synchronization module belonging to the digital display device of FIG. 2.

DETAILED DESCRIPTION OF THE DISCLOSURE

In the various figures, the same reference signs designate identical or similar elements.

Figure 1:
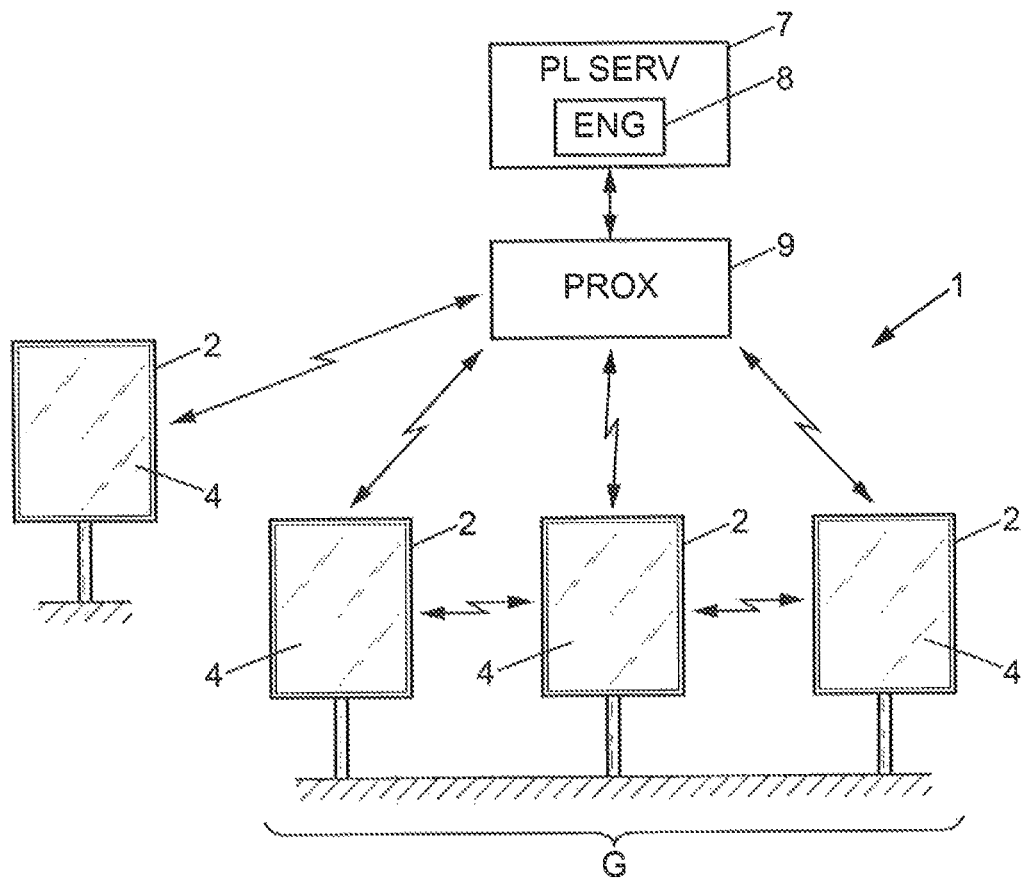
FIG. 1

FIG. 1 shows a digital display system 1 comprising a set of digital display devices 2. There may be a large number of digital display devices, possibly several thousands, possibly distributed over a wide geographical area. Certain digital display devices 2 form a group G of digital display devices 2, the displays of which must be coordinated. System 1 can have several groups G.

The digital display devices 2 of a same group G are generally visible simultaneously by a same observer.

Figure 2:
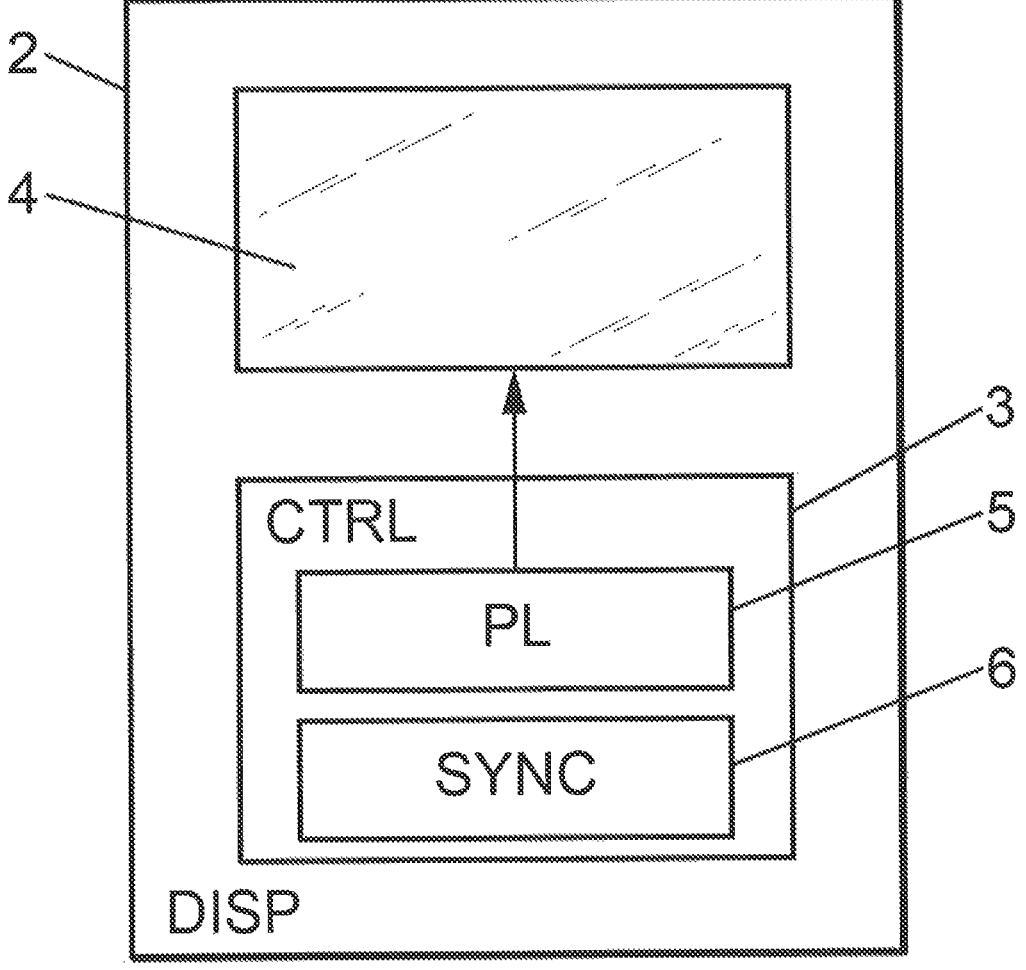
FIG. 2

As shown in FIG. 2, each digital display device 2 (DISP) includes a control device 3 (CTRL) such as a microcomputer or the like, which controls a digital screen 4.

The control device 3 executes a digital content player 5 (PL) (software module executed by the control device 3) and also executes a synchronization software module 6 (SYNC).

As represented in FIG. 1, the digital display system 1 also comprises a central platform 7 (PL SERV), which is common to the digital display devices 2 mentioned above. The platform 7 for generating playlists is a software package which can be executed on one server or several servers.

The central platform 7 is adapted to inform the digital display devices 2 of the digital contents that they must play, contents which are defined in playlists respectively stored by the digital display devices 2. In the example herein considered, the central platform 7 can generate the playlists and transmit them to the digital display devices 2, but it would also be possible for the digital display devices 2 to determine the playlists themselves based on the information received from the central platform 7.

The central platform 7 for generating playlists can execute an engine 8 (ENG) for generating content lists and loading manifests, as will be explained in more detail below.

The synchronization module 6 of each digital display device 2 communicates with the central platform 7 and if necessary with other resources possibly available on the Internet 9 (INT). In the represented embodiment, the digital display devices 2 communicate with the central platform 7 and with said other resources via at least one proxy server 9 (PROX).

This communication can take place over any wide area network (WAN). For example, in many cases this communication can be made by a mobile telephone network (broadband cellular network, for example of the 3G or 4G type). Of course, any other communication means is possible.

Engine 8 is adapted to generate repeatedly and/or depending on certain triggering facts (modification of programming, of content, etc.) playlists according to the displaying campaigns in progress. This playlist generation is performed according to the reservations made by the advertisers concerning the various display devices 2, according to the digital contents to be played for these displaying campaigns and according to the available digital display devices.

Each playlist is intended to be played by one or several of said digital display devices 2.

Each playlist may comprise at least one set of digital content identifiers to be sequentially played, over one or several predetermined time periods, these digital contents being assigned to successive time slots. These time slots may or may not be of the same duration. The duration T of these time slots may in particular be by comprised between 5 and 20 s, by way of example 10 s.

According to an embodiment, the playlist does not include any address for loading the digital contents or any digital fingerprint of the digital contents; it is therefore a document representing a small volume of data.

The engine 8 is further adapted to generate repeatedly and/or depending on certain generating events (modification of programming, contents, etc.), for each digital display device, a loading manifest comprising at least addresses for loading digital contents referenced in the loading list. Each loading manifest may further include, for each digital content, the identifier included in the playlist.

Each loading manifest can further comprise at least one reference digital fingerprint for each digital content being referenced in said loading manifest. According to an example, the digital fingerprint can be a checksum, for example of the "MD5" type. According to another example, the digital fingerprint can be a "GPG" type digital signature. According to a third example, the loading manifest can also comprise two reference digital fingerprints for each digital content, in particular a checksum for example of the "MD5" type and a more complex digital signature, for example of the "GPG" type.

The generation frequency of the playlists and loading manifests by the engine 8 can be variable according to the arrival speed of new reservations or reservation modifications by the advertisers. This frequency can go up to once every few minutes, or even higher frequencies, knowing that part of the reservations can be made by automatic online bids. Certain playlist updates are carried out without changing the loading manifest when the modifications concern, for example, the digital contents playing order or frequency, or even the playing conditions of the digital contents.

The synchronization modules 6 of the digital display devices 2 are adapted to update their playlists and loading manifests, from the engine 8.

This update may include the following steps:

c1) The synchronization module 6 of the display device 2 interrogates the engine 8 by sending a request at predetermined intervals, to determine if the engine 8 has a new playlist and/or a new loading manifest corresponding to the digital display device 2. The frequency for interrogating the engine 8 can be fixed (e.g., every few minutes) or determined by a previously downloaded playlist and/or loading manifest from engine 8. For example, the frequency for interrogating the engine 8 for playlists can be fixed (e.g., every few minutes, in particular every 5 minutes) and the frequency for interrogating the engine 8 for loading manifests can be included in the playlists. Playlists and loading manifests can be timestamped, and in order to determine if engine 8 has a new playlist corresponding to the digital display device 2, synchronization module 6 can send a request to engine 8 to receive the timestamp of the current playlist for the digital display device 2. If this timestamp is more recent than the timestamp of the last playlist downloaded by the digital display device 2, then it is determined that engine 8 has a new playlist corresponding to the digital display device 2. The same operation will be applied for the loading manifests. c2) If it is determined that engine 8 has a new playlist corresponding to the digital display device 2 and/or a new loading manifest, the synchronization module 6 loads the new playlist and/or the new loading manifest from engine 8 (by sending a request asking to receive the new playlist and/or the new loading manifest).

c3) if a new loading manifest has been loaded from the engine 8, the synchronization module 6 of the digital display device 2 determines which is/are the new digital content(s) referenced in the new loading manifest. This determination can be made for example by comparing the digital fingerprints of the digital contents referenced in the new loading manifest with the digital fingerprints of the digital contents already present in the memory of the digital display device 2.

c4) The synchronization module 6 of the digital display device 2 then downloads said new digital content(s) from the URL address(es) corresponding to each digital content indicated in the new loading manifest. In general, this download can take place via the internet 9. The URL addresses in question may correspond to the platform 7 for generating playlists, to another server specific to the operator of the platform 7 for generating playlists or to another location on the Internet.

The player 5 of each digital display device 2 is adapted to read the digital contents corresponding to its current playlist (last playlist loaded by the synchronization module 6) and to display these digital contents on the digital screen 4 of the digital display device 2.

At steps (c1) and (c2), the synchronization module 6 of each digital display device 2 always sends its requests to the same URL address which is specific to the digital display device 2.

At steps (c1) and (c2), the synchronization module 6 and the engine 8 can advantageously communicate in encrypted fashion, for example by using the "https" protocol.

At step (c4), the synchronization module 6 of the digital display device 2 can determine a calculated digital fingerprint of the new downloaded digital content, check whether the calculated digital fingerprint corresponds to the reference digital fingerprint contained in the loading manifest and validate the uploaded digital content only if the calculated digital fingerprint matches the reference digital fingerprint. If the downloaded digital content is not validated, it is destroyed. If the uploading manifest contains two (or more) digital fingerprints for at least some digital contents, this validation may be performed for the different digital fingerprints of the digital content, sequentially or in parallel.

At step (c4), the synchronization module 6 of the digital display device 2 can download the new digital contents in a non-encrypted manner, for example by using the "http" protocol.

At step (c4), the synchronization module 6 of the digital display device 2 may, in one embodiment, download the new digital contents piece by piece.

Furthermore, the central platform 7, in particular by the engine 8, is adapted to keep up to date a list of digital display devices 2 of the system that belong to a group G, for example according to configuration modifications input by a manager system user 1.

The motor 8 is further adapted to inform each digital display device 2 of the group G to which it possibly belongs (by sending a group identifier) and of the other digital display devices belonging to the same group G. This piece of information can be transmitted to the synchronization module 6 of each digital display device 2 in the playlists, or separately in configuration information. This information can be performed in both cases in an update request process of the synchronization module 6, as previously explained.

The digital display devices 2 of the same group G are adapted to elect a leader among said digital display devices 2 of the group G, using a consensus algorithm, said leader being adapted to send synchronization messages to the other digital display devices 2 (followers) of group G.

The consensus algorithm can be a "RAFT" algorithm.

The consensus algorithm can regularly keep up to date, at the level of each digital display device 2, the number of digital display devices 2 of the group G, from the messages recently received from the other digital display devices 2 of group G (for example from messages received within the last 10 to 60 s).

The leader election process can be repeated, for example when one of the followers has not received any messages from the leader for a predetermined time.

The information exchanges between the digital display devices 2 of the group G can be carried out according to the "UDP" protocol, allowing real-time or quasi-real-time operation. The synchronization level between the digital display devices 2 of group G can thus be in the order of a millisecond or less (excluding intrinsic latency to the communication network by which said digital display devices 2 of group G communicate with each other).

The messages sent between the digital display devices 2 of the group G can advantageously be authenticated by a digital signature.

The digital signature can for example be of the "HMAC" type, in particular "HMAC-SHA-256".

The messages sent between the digital display devices 2 of the group G can also be timestamped, and the digital signature is calculated taking into account the timestamp.

The digital signature can be calculated from a secret signature key which is common to the digital display devices 2 of group G.

Signature authentication allows to prevent that group G of digital display device 2 provides a security breach against takeover attempts or other malicious actions by third parties.

The timestamp also provides an additional security level: a digital display device 2 of group G which receives a synchronization message or any other message from another digital display device 2, can compare the timestamp of the received message with the precise current time, and may not take into account the received message for example if the difference between the two times is greater than a predetermined threshold. This threshold can for example be between 1 ms and 1 s, for example between 1 ms and 100 ms.

Messages sent between the digital display devices 2 of group G can be non-encrypted. Help is thus brought for the group G of digital display devices 2 to have a real-time operation allowing a very precise synchronization of the digital display devices 2, without the unencrypted transmission of the messages creating a security breach, the security being ensured by electronic signature authentication possibly reinforced by the timestamp.

From the synchronization messages of each digital display device 2 of group G, a display starting time for each digital content of the playlist of each digital display device

2 of group G is defined, so as to obtain coordinated displays by all digital display devices 2 of group G.

Most often, the display starting times of the respective digital contents by the digital display devices 2 of the group G are identical, but they can also be temporally offset in a predetermined manner to obtain a movement effect or to follow a moving user (for example along a moving walk or an escalator). The digital contents thereby "synchronized" can be identical for all the digital display devices 2 of group G, or different.

Figure 3:
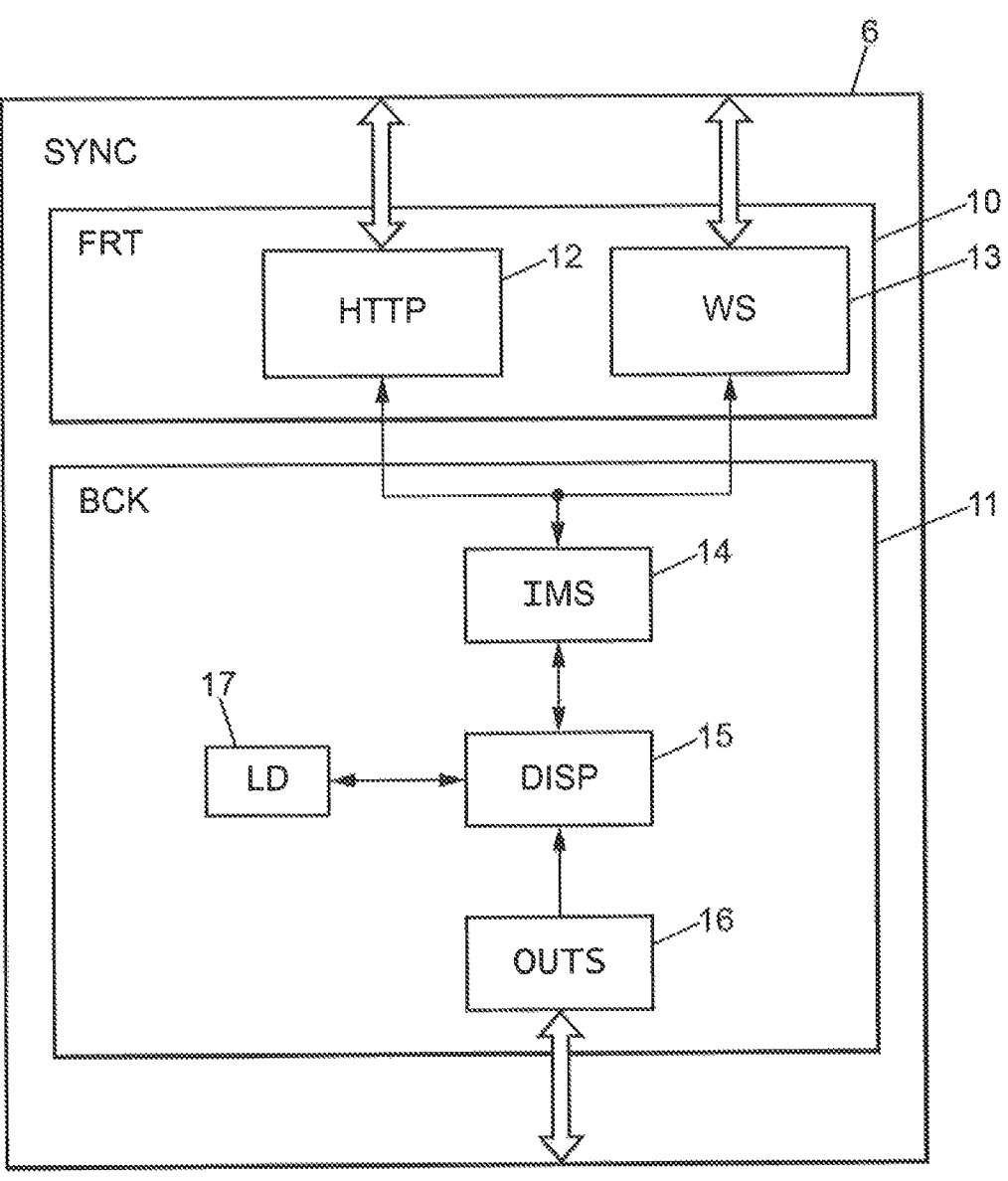
FIG. 3

As shown in FIG. 3, the synchronization module 6 may include a front part 10 (FRT—"frontend") in communication with the central platform 7 and a rear part 11 (BCK—"backend") in communication with the synchronization modules 6 of the other digital display devices 2.

The front part 10 can for example comprise an http server 12 (HTTP) and a "WebSocket" server 13 (WS), respectively implementing an HTTP "API" (Application Programming Interface) and a "Websocket" API. The HTTP API is used to modify the state of the backend 11 while the "Websocket" API is used to receive events, for example playlist updates and loading manifests, or even a priority digital content broadcast order, interrupting the digital containers being currently broadcast by the digital display device 2.

The rear part 11 may comprise:

an internal interface 14 (INS) communicating with the front part 10, a message distribution module 15 (DISP) communicating with the internal interface 14, an external interface 16 (OUTS) communicating the message distribution module 15 in particular with the synchronization modules 6 of the digital display devices 2 (in particular by using the "UDP" protocol as explained above), a "RAFT" module 17 (LD) serving to implement the consensus algorithm.

The invention claimed is:

1. A digital display method for displaying digital contents in a coordinated manner by digital display devices belonging to a group, the digital contents being defined in playlists stored by each of the digital display devices, the method including:

electing by the digital display devices of the group, a leader among said digital display devices of the group, using a consensus algorithm;

determining from synchronization messages sent by the leader to the other digital display devices of the group, a display starting time for each digital content defined by the playlist of each device of digital display of the group, wherein the digital display devices of the group belong to a set of digital display devices also comprising digital display devices not belonging to said group, the method further comprising:

keeping up to date, by a central platform, a list of digital display devices of the set which belong to said repeatedly updating the digital display devices of the set with said central platform so that each digital display dex s of the set has in memory a piece of information indicating whether it belongs to a group ar digital display device of said group has in memory the list of digital display devices of said group.

2. The method according to claim 1, wherein the consensus algorithm is a "RAFT" algorithm.

3. The method according to claim 1, wherein the digital display devices of the group are simultaneously visible by a same observer.

4. The method according to claim 1, wherein the display starting times of the respective digital contents defined by the playlists of the digital display devices of the group are either identical or temporally offset in a predetermined way.

5. A digital display system comprising digital display devices, at least some of said digital display devices belonging to a group, the digital contents being defined in playlists memorized by each of the digital display devices, the digital display devices of d group being adapted to:

elect a leader among said digital display devices of the group, using a cons us algorithm said leader being adapted to send synchronization messages to the other digital display devices of the group:

determine from the synchronization sa arting time for each digit content defined by the playlist of each digital display device of the group, wherein the digital display devices of the group belong to a set of digital display devices also comprising digital display devices not belonging to said group, the system further comprising a central platform adapted to keeping up to date a list of digital display devices of the set which belong to said group, the system being adapted to repeatedly update the digital display devices of the set with said central platform so that each digital display device of the set has in memory a piece of information indicating whether it belongs to a group and so that each digital display device of said group has in memory the list of digital display devices of said group.

6. The system according to claim 5 wherein the consensus algorithm is a "RAFT" algorithm.

7. The system according to claim 5, wherein the digital display devices of the group are simultaneously visible by a same observer.

8. The system according to claim 5, wherein the display starting times of the respective digital contents defined by the playlists of the digital display devices of the group are either identical or temporally offset in a predetermined way.

9. The system according to claim 5, wherein the messages sent between the digital display devices of the group are authenticated by a digital signature.

10. The system according to claim 9, wherein the messages sent between the digital display devices of the group have a timestamp, and the digital signature is calculated taking into account the timestamp.

11. The system according to claim 9, wherein the messages sent between the digital display devices of the group have a timestamp, and each digital display device of the group which receives a message from another digital display device of the group is adapted to:

calculate a difference between the timestamp of the received message and the current time, and not take into account the received message if said difference is greater than a predetermined threshold.

12. The system according to claim 9, wherein the messages sent between the digital display devices of the group are non-encrypted.

13. The system according to claim 5, wherein the digital display devices of the group communicate with each other according to a User Datagram Protocol, the synchronization messages allowing synchronization with an error of less than 5 ms between the digital display devices of the group, excluding intrinsic network latency.

14. The system according to claim 5, wherein the central platform is further adapted to inform the digital display devices of the set, about the digital contents which they must play.

* * * * *